US010260403B2

(12) United States Patent
Takahashi et al.

(10) Patent No.: US 10,260,403 B2
(45) Date of Patent: Apr. 16, 2019

(54) CONTROL SYSTEM FOR WASTE GATE VALVE OF AN INTERNAL COMBUSTION ENGINE

(71) Applicant: Mitsubishi Electric Corporation, Tokyo (JP)

(72) Inventors: Tatsuhiko Takahashi, Hyogo (JP); Takahiko Ono, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 15/259,606

(22) Filed: Sep. 8, 2016

(65) Prior Publication Data
US 2017/0306834 A1 Oct. 26, 2017

(30) Foreign Application Priority Data
Apr. 26, 2016 (JP) .................................. 2016-087655

(51) Int. Cl.
| | | |
|---|---|---|
| *F02B 37/18* | (2006.01) | |
| *F02B 39/16* | (2006.01) | |
| *F02D 41/00* | (2006.01) | |
| *F02D 41/24* | (2006.01) | |

(52) U.S. Cl.
CPC ............ *F02B 37/18* (2013.01); *F02B 37/186* (2013.01); *F02B 39/16* (2013.01); *F02D 41/0007* (2013.01); *F02D 41/2464* (2013.01); *Y02T 10/144* (2013.01)

(58) Field of Classification Search
CPC ........................................ F02B 37/18–37/186
See application file for complete search history.

(56) References Cited

U.S. PATENT DOCUMENTS

| | | | | |
|---|---|---|---|---|
| 2005/0092292 A1* | 5/2005 | Kamimura | .............. | F02D 9/105 123/396 |
| 2006/0213194 A1* | 9/2006 | Hasegawa | ................ | F01N 3/00 60/602 |
| 2008/0066723 A1 | 3/2008 | Eiraku | | |
| 2013/0327037 A1* | 12/2013 | Fukui | .................. | F02D 41/0007 60/600 |

(Continued)

FOREIGN PATENT DOCUMENTS

| | | | | |
|---|---|---|---|---|
| JP | 2006105096 A | * | 4/2006 | ............. F02B 37/18 |
| JP | 2015-059549 A | | 3/2015 | |
| JP | 2015059549 A | * | 3/2015 | |

OTHER PUBLICATIONS

Communication dated Mar. 7, 2017, from the Japanese Patent Office in counterpart application No. 2016-087655.

*Primary Examiner* — Laert Dounis
(74) *Attorney, Agent, or Firm* — Sughrue Mion, PLLC; Richard C. Turner (57) ABSTRACT

In a control system for an internal combustion engine, the waste gate actuator controls the opening and closing of a waste gate valve according to operation amount controlled by the control device, an actual position of the waste gate actuator detected by the position sensor for detecting the position of the waste gate actuator which correlates to the actual open position of a waste gate valve is inputted to the control device, the control device performs control for limiting the operation amount to stop to predetermined opening deviation in the direction toward open side from open side stopper position of the waste gate.

3 Claims, 9 Drawing Sheets

(56) References Cited

U.S. PATENT DOCUMENTS

| | | | | |
|---|---|---|---|---|
| 2014/0060041 A1* | 3/2014 | Makino | .................. | F02B 37/127 |
| | | | | 60/602 |
| 2014/0325982 A1* | 11/2014 | Maruo | .................. | F02B 37/183 |
| | | | | 60/602 |
| 2015/0337718 A1* | 11/2015 | Saeki | .................. | F02D 41/0007 |
| | | | | 60/602 |
| 2016/0305312 A1* | 10/2016 | Ismail | .................... | F02B 37/183 |
| 2016/0319755 A1* | 11/2016 | Wanibe | ............... | F02D 41/0007 |
| 2018/0100455 A1* | 4/2018 | Takahashi | ............... | F02B 33/44 |
| 2018/0119607 A1* | 5/2018 | Ono | ..................... | F02B 37/186 |

* cited by examiner

Target supercharging pressure map [Unit: kPa]

|  |  | Engine rotation speed [r / min] | | | | | |
|---|---|---|---|---|---|---|---|
|  |  | 1000 | 2000 | 3000 | 4000 | 5000 | 6000 |
| Accelerator opening [%] | 10 | 100 | 100 | 100 | 100 | 100 | 100 |
| | 20 | 100 | 100 | 100 | 100 | 120 | 120 |
| | 30 | 100 | 100 | 100 | 100 | 120 | 140 |
| | 40 | 120 | 120 | 120 | 120 | 140 | 180 |
| | 50 | 120 | 140 | 140 | 120 | 160 | 180 |
| | 60 | 120 | 140 | 140 | 140 | 160 | 200 |
| | 70 | 120 | 160 | 180 | 180 | 200 | 200 |
| | 80 | 120 | 160 | 180 | 180 | 220 | 200 |
| | 90 | 140 | 180 | 200 | 200 | 220 | 240 |
| | 100 | 140 | 200 | 220 | 220 | 240 | 240 |

CONTROL SYSTEM FOR WASTE GATE VALVE OF AN INTERNAL COMBUSTION ENGINE

BACKGROUND OF THE INVENTION

Field of the Invention

The present invention relates to a control system for an internal combustion engine with a turbocharger, for example, for a vehicle, particularly, to a control device for opening and closing control of a waste gate valve by controlling an operation amount of a waste gate actuator driven by electric energy.

Description of Related Art

In a conventional internal combustion engine, hereinafter referred as engine, for the purpose to improve the output of the engine, it is known that the turbocharger is provided with a supercharger operated by rotating the turbine due to exhaust gas.

In such a turbocharger, when the engine is operated at high speed and high load, because it may damage the engine, the pressure in the intake passage of an engine, namely boost pressure, increases more than necessary, typically, an exhaust bypass passage is provided in parallel with the turbine.

Then, according to the waste gate valve provided in the exhaust bypass passage, a part of the exhaust gas, flowing through the exhaust passage, diverged through the exhaust bypass passage, then the flow amount of exhaust gas to the turbine is adjusted, and thereby the boost pressure is controlled to an appropriate value.

The waste gate valve is, for example, used for the opening and closing operation by the driving of the positive pressure actuator. Specifically, when the operating condition in which the pressure at an intake passage of an engine, in particular, at upstream area of the throttle valve that the pressure increases, is higher than atmospheric pressure, by driving the positive pressure actuator, opening degree of the waste gate valve aperture is adjusted.

Usually, in a positive pressure actuator, during the period until the driving of the positive pressure actuator becomes to be enabled, the waste gate valve is in a fully closed state.

It should be noted that, in the following description, the Waste Gate Valve is referred as the WGV, and the Waste Gate Actuator to operate the WGV is referred as WGA.

In the positive pressure actuator, if the pressure in the intake passage of the engine does not become higher than the threshold, it is not possible to operate the WGV. That is, when the pressure is equal to or smaller than the threshold, it is not possible to operate the WGV, and it is impossible to change the opening degree of the WGV.

Therefore, in recent years, the WGA is improved to electrically powered, regardless of the pressure in the intake passage of the engine, as required, the WGV is driven, it has been proposed as a system that makes it possible to freely restrict the supercharging by the turbocharger.

However, in such system, due to the impact of the overtime due changes to the opening and closing operation of the WGV repeatedly performed for a long time, the temperature characteristics of the WGV opening sensor detecting opening degree of the WGV, the thermal expansion of the structure that constitutes the WGV, errors are shown between the detected value of the WGV opening sensor and the actual opening degree of the WGV.

As the result, the reference position of the WGV, namely position of WGV when the detected value of the WGV opening sensor becomes 0%, is deviated regarding the actual fully closed position of the WGV.

Therefore, even when controlled to the needed target opening degree, a deviation to the actual WGV opening degree is shown, and it cannot be controlled to a desired supercharging pressure. Alternatively, it is possible that the boost pressure does not reach the control target value.

In Patent Document 1, when the actual opening degree, in a state where the target opening degree in the fully closed position, is determined that it has converged to a fully closed state, the learning of the fully closed position based on the output value of the opening sensor at the time is performed, depending on the temperature change from the time of updating the fully closed learning value, by modifying the fully closed learning value to a value commensurate with the sensor output characteristic change, even if the temperature conditions change, the control accuracy of the WGV mechanism is maintained.

Patent Document 1: JP-A-2015-59549

In an ordinary control system for an internal combustion engine of the kind shown in Patent Document 1, according to the effects of the changes over time due to the fact that the opening and closing operation of the WGV is repeatedly carried out over a long period of time, the temperature characteristics of the WGV opening sensor, as well as thermal expansion of the structure constituting the WGV, due to the influence of the error caused between the detected value of the WGV opening sensor and the actual WGV opening degree, it is necessary to process in a revision of the deviation of the fully closed position by the learning and the fully closed position when temperature change to be performed. From this, the decrease of the error in the actual fully closed position and the fully closed learning value is attempted, but in order to learn the fully closed position, it is necessary to control the WGV to the full closed position.

However, in order to increase the supercharging pressure when the WGV is fully closed, depending of the way of operation, it is considered that without being able to obtain the opportunity to implement the fully closed learning, the state in which the learning value is not updated will continue.

In this case, the fully close learning value deviated from the actual fully closed position has been stored, even if the fully closed learning value according to the temperature change is revised, the amount of revision in the fully closed position according to the temperature change is only an estimate value, and the estimation accuracy with the passage of time is exacerbated.

Therefore, also in Patent Document 1, when the opportunity to update the fully closed learning value is small, it is expected for the actual fully closed position that the fully closed learning value is deviated. Further, the fully closed learning value, in a state in which the open side is more shifted than the actual fully closed position, if the request for the target opening degree becomes fully opened, the actual opening amount is too opened regarding the required opening degree, in equal to or more than the allowable value of speed, an unpleasant collision noise is generated when coming in contact with the open side stopper of the WGA, according to the continuation of the state in which it comes in contact with the open side stopper of the WGA, a new problem arises, such an abnormal overheating of the motor of the WGA due to the continuation of the driving current of the motor toward the open side when too large.

SUMMARY OF THE INVENTION

The present invention has been made in consideration of such circumstances, and has an object to provide a control system for an internal combustion engine to prevent that a WGA occurs an unpleasant impact noise when coming in contact to the open side stopper, and then the driving current of the motor of the WGA toward opening side of the WGV becomes too large, and causes that the WGA is overheated.

A control system for an internal combustion engine according to the present invention, including a control device controlling operation amount of a waste gate actuator driven by electrical energy, and a position sensor detecting actual position of the waste gate actuator, the waste gate actuator controls the opening and closing of a waste gate valve according to operation amount controlled by the control device, an actual position of the waste gate actuator detected by the position sensor for detecting the position of the waste gate actuator which correlates to the actual open position of a waste gate valve is inputted to the control device, and the control device performs control for limiting the operation amount to stop to predetermined opening deviation in the direction toward open side from open side stopper position of the waste gate.

A control system for an internal combustion engine according to the present invention, including a control device controlling operation amount of a waste gate actuator driven by electrical energy, and a position sensor detecting actual position of the waste gate actuator, the control device having a driving part for controlling the operation amount of the waste gate actuator by driving the waste gate actuator, a reference position learning part that learns a reference position when the actual position detected by the position sensor is in the reference position, an actual opening degree calculation part for calculating an actual opening degree of the waste gate valve based on the reference position learned by the learning position part and the actual position detected by the position sensor, a request operation amount calculating part that calculates the required operation amount for the drive part based on the actual opening and the target opening, an operation amount limiting value calculating part that calculates an operation amount open side limit value for limiting the request operation variable, and an operation amount limiting part for limiting the request operation variable to the operation amount open side limit value.

ADVANTAGEOUS EFFECTS OF THE INVENTION

Because a control system for an Internal combustion engine according to the invention including a control device controlling operation amount of a waste gate actuator driven by electrical energy, and a position sensor detecting actual position of the waste gate actuator, the waste gate actuator controls the opening and closing of a waste gate valve according to operation amount controlled by the control device, an actual position of the waste gate actuator detected by the position sensor for detecting the position of the waste gate actuator which correlates to the actual open position of a waste gate valve is inputted to the control device, and the control device performs control for limiting the operation amount to stop to predetermined opening deviation in the direction toward open side from open side stopper position of the waste gate, it is possible to prevent to generate an unpleasant collision noise when the waste gate actuator comes in contact with the open side stopper, and to prevent the abnormal overheating of the waste gate actuator when the waste gate actuator driving current to the open side becomes too large.

If the fully closed learning value matches the actual WGV fully closed position, even if the feedback control of the WGA is driven toward the maximum target opening, according to the speed of the actual opening decelerated when the actual opening degree is close to the target opening degree and the fully open position on the control set to a smaller opening than the opening side stopper position of the WGA, at a rate that exceeds the collision limit speed, the WGA doesn't come in contact with the open side stopper position.

However, if the fully closed learning value is more shifted to the open side than the actual fully closed position, the position corresponding to the maximum target opening may become the position of the open side instead of the opening side stopper position, in such a state, when the control feedback of the WGA toward the maximum target opening is driven, there is a possibility to comes in contact with the open side stopper position in excess of the speed of the collision limit speed.

Also, according to claim 4 of a control system for an internal combustion engine according to the present invention, by the limitation of the use of the operation amount open side limit value by the request operation amour calculated on the basis of the target opening degree and the actual opening degree, in order to decelerate under the collision limit speed the speed of the WGA that operates toward the open side stopper, in excess of the speed of the collision limit speed it is possible to avoid the emission of an unpleasant collision noise of the WGA to the open side stopper.

Also, according to claim 5, the operation amount open side limit, by comparing the actual position detected by the position sensor and the limited determination position, switches the limit valid and invalid values, the limited determination position, according to the setting between the position of corresponding to the maximum target opening degree calculated based on the designed value of the fully closed position and the position of the open side stopper of the WGA, can limit the WGA operation amount by the limit value only when necessary. Further, by comparing the actual position detected by the position sensor and the limited determination position, it is possible to set a limit value when the open side stopper position of the WGA reaches a predetermined opening deviation.

Further, according to claim 6 or claim 7, by setting to a value that can stall or stop the WGA to be headed to the open side stopper position, a contact with the open side stopper position of the WGA can be avoided, a generation of unpleasant noise when the WGA is in contact with the open side stopper position can be prevented, also, when the state in which a contact to the open side stopper position of the WGA is in continuation, the operation amount of the WGA become excessive, and it becomes possible to prevent the motor of the WGA from overheating.

DETAILED DESCRIPTION OF THE PREFERRED EMBODIMENTS

First Embodiment

Figure 1:
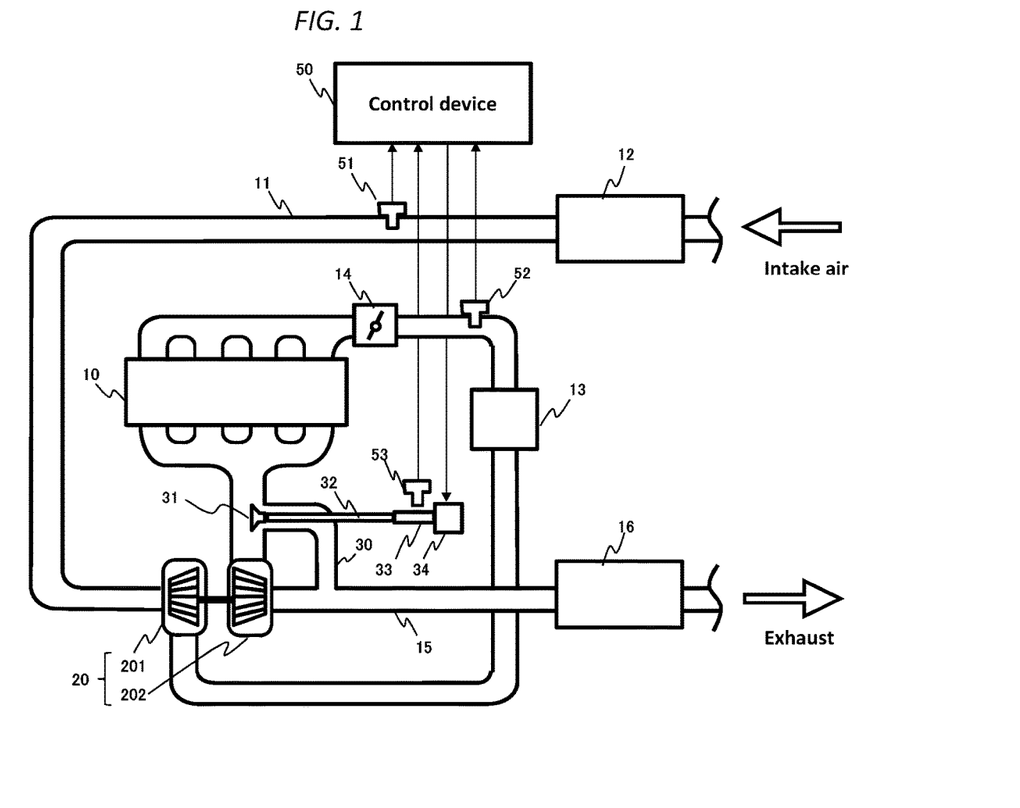
FIG. 1 is a diagram showing an example of a system configuration of an engine control apparatus for an engine according to a first embodiment of the present invention.

FIG. 1 is a system configuration diagram of an engine control apparatus for an engine according to a first embodiment of the present invention. In FIG. 1, an air cleaner 12 is attached to an inlet of an intake passage 11 of the engine 10. On the downstream side of the air cleaner 12, an air flow sensor 51 for detecting an intake air quantity is set.

A turbocharger 20 is provided in the downstream of the air flow sensor 51. The turbocharger 20 includes a compressor 201 and a turbine 202. The compressor 201 and the turbine 202 are coupled together by a connecting shaft. The compressor 201 is driven to rotate by fluid energy of the exhaust gas input to the turbine 202. Then, an intercooler 13 for cooling the compressed air is disposed in the downstream of the compressor 201. A throttle valve 14 is disposed in the downstream of the intercooler 13. Further, a boost pressure sensor 52 for detecting the pressure of the supercharged intake air is provided between the intercooler 13 and the throttle valve 14.

Also, the exhaust system of the engine 10 includes an exhaust passage 15. A turbine 202 of the aforesaid turbocharger is provided in the middle of the exhaust passage 15. Further, an exhaust bypass passage 30 connected to the inlet and outlet sides of the turbine 202 by bypassing the turbine 202 is provided in the exhaust passage 15. A WGV31, as an exhaust bypass valve, is disposed in the exhaust bypass passage 30. In addition, an exhaust gas purifying catalyst 16 for purifying the exhaust gas is disposed on the downstream side of the turbine 202.

The WGV31 disposed in the exhaust bypass passage 30 is mechanically connected to one end of a joint member 32. The other end of the joint member 32 is mechanically connected to an output shaft 33 of the WGA34 as an exhaust bypass valve driving device. Then, in the vicinity of the output shaft 33 of the WGA34, a position sensor 53 for detecting the position information correlated to the valve opening position of the WGV31 is provided. Further, the position sensor 53 in this embodiment is configured separately from the WGA34, but may be incorporated in the WGA34.

The engine control apparatus according to the first embodiment of the invention provides a control device 50.

In the input part of the control device 50, in addition to the aforesaid air flow sensor 51, the supercharging pressure sensor 52 and the position sensor 53, various sensors such as a crank angle sensor and an accelerator opening sensor, not shown in figures, are connected to detect the operating state of the engine 10 by the control device 50.

In the output part of the control device 50, in addition to the WGA34, various actuators such as an injector and an ignition coil, not shown in figures, are connected to control the operation state of the engine 10 by the control device 50.

The control device 50, based on the various input information described above, by driving the various actuator described above, optimally controls the combustion state and the output torque of the engine 10.

Figure 2:
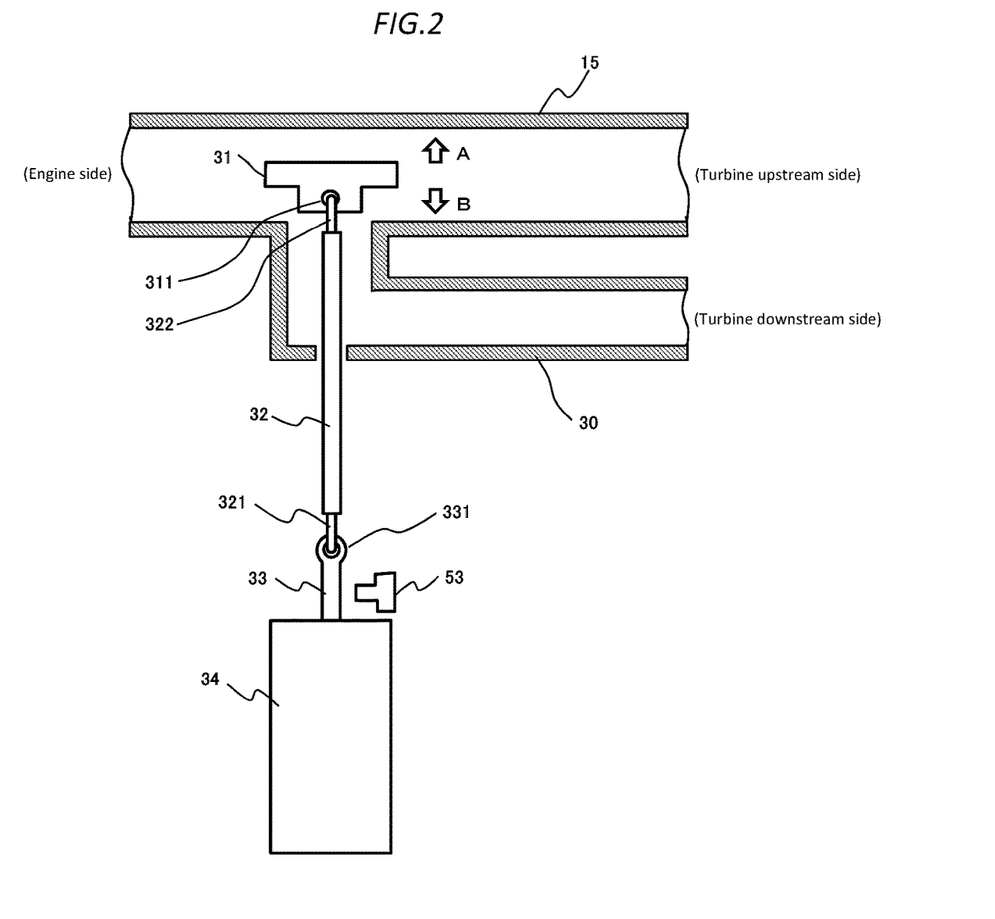
FIG. 2 is a schematic diagram for explaining an example of the mechanical connection state of the WGV and the WGA in an engine control apparatus of the engine according to a first embodiment of the present invention.

Next, the mechanical connection between the WGV31 and the WGV34 will be described in detail. In the engine control apparatus of the engine according to a first embodiment of the present invention, FIG. 2 is a schematic diagram for explaining the mechanical connection state of the WGV31 and the WGA34. In FIG. 2, the WGV31 and the WGA34 are connected via a joint member 32 without being directly connected.

More specifically, a WGA output axial joining part 331 formed at the tip part of the WGA output shaft 33, and a first joining part 321 formed at one end of the joint member 32 are jointed to freely swing each other through the inside, as being so called a universal joint.

The WGV joining part 331 owning a through-hole provided in the WGV31 and a second joining part 322 formed at the other end of the member 32 are jointed to freely swing by being penetrated in the through-hole of the WGV joining part 311 by the second joining part 322, as being so called a universal joint.

The WGV31, arranged in the exhaust passage 15, is exposed in a hundred degrees high-temperature state by the discharged exhaust gas from the engine 10. Therefore, considering the heat resistance of the WGA34 with a built-in electronic components such as a motor, since the WGA34 can not be arranged close to the WGV31, a joint member 32 is interposed between WGV31 and the WGA34, the WGA34 avoids too high temperature. Further, by mechanically connecting the WGA34 and the WGV31 via the joint member 32, the fact that the degree of freedom of the mounting position of the WGA34 to the vehicle is easily increased by the layout is also one of the reasons for interposing the joint member 32.

In the WGA34, a forward and reversible motor being well known is built, also, and the WGA has the output shaft 33 for outputting the rotational motion of the motor converted into linear motion. This WGA output shaft 33 becomes movable in the axial direction according to the energizing direction of the motor, if energizing the motor in the direction to push the WGA output shaft 33 on the outside of the WGA34, it becomes possible to move the WGV31 through the joint member 32 to the valve opening side, that is in the direction of arrow A in FIG. 2. On the contrary, if energizing the motor in the direction to pull the WGA output shaft 33 on the inner side of the WGA34, it becomes possible to move the WGV31 through the joint member 32 to the valve closing side, that is in the direction of arrow B in FIG. 2. Also, by energization of the motor to zero, in absence of a disturbance such as an exhaust gas stream, it is possible to be stopped in the opening and closing valves without being moved.

Further, in the vicinity of the side of WGA output shaft 33, a position sensor 53 is provided. The axial position of the WGA output shaft 33 detected by the position sensor 53 is configured to be incorporated into the control device 50, as shown in FIG. 1, as the actual operating position of the WGV31, in other words the open or closed actual position of the WGV31, as well as an intermediate position there between.

Figure 3:
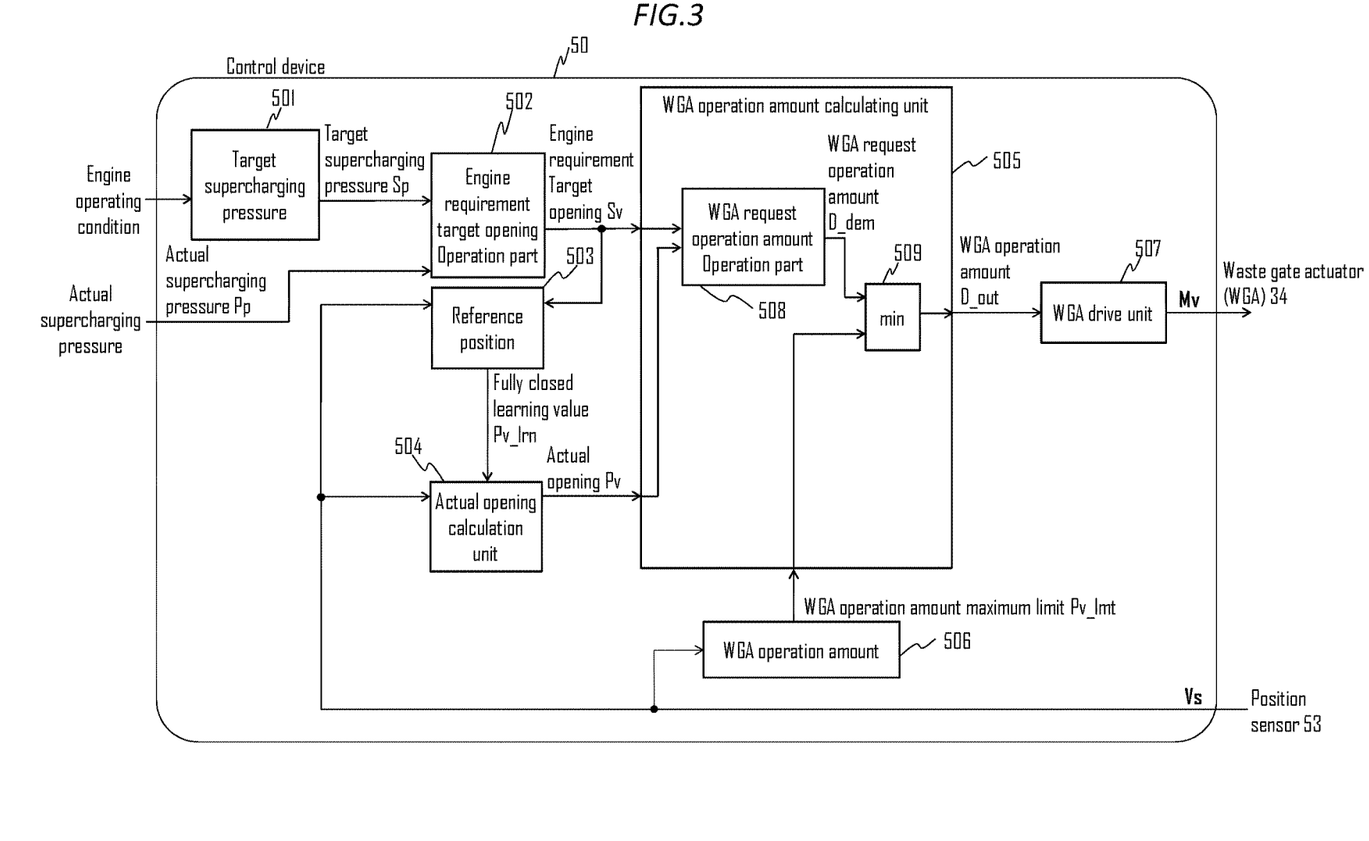
FIG. 3 is a block diagram showing an example of a control system for an internal combustion engine according to the first embodiment of the present invention.

FIG. 3 is a block diagram showing an example of the internal configuration of the control device 50 of the engine according to the first embodiment of the present invention. With reference to FIG. 3, first of all, a description of the configuration and operation related to the basic control of the WGV31 will be given.

The control device 50, based on the detection results of various sensors described above, performs the general control of the engine 10. As a WGV31 control portion, it owns a target boost pressure calculating part 501, an engine requirement target opening calculation part 502, a reference position learning part 503, an actual opening calculation part 504, a WGA operation amount calculation part 505, a WGA operation amount limit value calculation part 506, a WGA drive part 507, a WGA request operation amount calculation part 508, and a WGA operation amount limiting part 509.

In the target supercharging pressure calculating part 501, the engine rotational speed calculated based on the crank angle detected by the crank angle sensor and a plurality of information indicating the operating state of the engine 10 such as the accelerator opening detected by the accelerator opening sensor are inputted, and based on the information of those of the input engine operating condition, the target boost pressure calculating part 501 sets the target boost pressure Sp being control target value.

Figure 4:
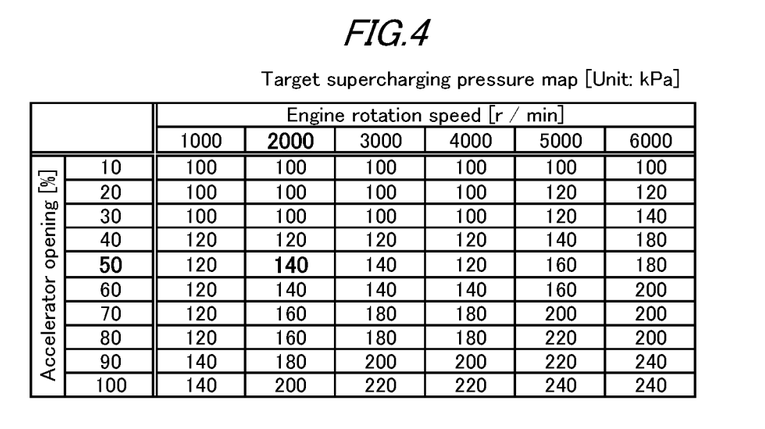
FIG. 4 is a diagram showing an example of a map for determining a target supercharging pressure according to the first embodiment of the invention.

Here, an example of how the target boost pressure calculating part 501 calculates the target supercharging pressure Sp, with reference to FIG. 4 will be described. FIG. 4 is a view showing an example of a map for determining a target supercharging pressure. Further, in the map shown in FIG. 4, the part of the target supercharging pressure is set to [kPa].

As shown in FIG. 4, the target supercharging pressure map is associated, with the engine rotational speed [r/min], the accelerator opening [%], and the target boost pressure [kPa]. The target boost pressure calculating part 501, according to the map, determines the target supercharging pressure corresponding to the accelerator opening and the engine speed.

In particular, for example, the engine rotational speed is 2000 [r/min], and the accelerator opening at 50 [%] are assumed. In the case of such a driving state, the target supercharging pressure calculating part 501 is determined by a target supercharging pressure to 140 [kPa] in accordance with the map.

Further, without using a target supercharging pressure map such as in FIG. 4, for example according to the physical model as defined previously, the target supercharging pressure calculating part 501, can be calculated to obtain a target boost pressure.

In the engine requirement target opening calculating part 502, the actual supercharging pressure Pp and the target boost pressure Sp computed by the target boost pressure calculating part 501 are input, and, in order to match the actual supercharging pressure Pp with the target boost pressure Sp, the required engine demand target opening Sv is calculated. It should be noted that the actual supercharging pressure Pp is the output of the boost pressure sensor 52. Also, the engine requirement target opening degree Sv is the target opening degree of the WGV31 that request the engine.

The reference position learning part 503 calculates the fully closed learning value Pv_lrn which is the fully closed position of the WGV when in the operating position for completely closing the exhaust bypass passage 30 from the actual position Vs detected by the position sensor 53. Since the actual opening degree of the WGV31 is impossible to be calculated if not fully closed, until the WGV31 is controlled first fully closed, and then the learning of the fully closed position is completed, predetermined initial value is set as the fully closed position of the WGV31.

In the actual opening calculation part 504, the actual position Vs detected by the position sensor 53 is input, and the actual opening degree Pv of the WGV31 is calculated based on the full closed learning value Pv_lrn calculated by the reference position learning part 503.

In the WGA request operation amount calculating part 508 formed in the WGA operation amount calculation part 505, according to the feedback control based on the engine requirement target opening degree Sv calculated by the engine requirement target opening calculating part 502 and the actual opening degree Pv calculated at the actual opening calculation part 504, in order to match the actual opening degree Pv to the engine requirement target opening degree Sv, the required WGA request operation amount D_dem is calculated. In the WGA operation amount limiting part 509 formed in the WGA operation amount calculation part 505, a small stealing to the computed WGA operation amount maximum limit Pv_lmt calculated in the WGA operation amount limit value calculation part 506, of which details will be described later, and the required WGA request operation amount D_dem is performed, the limited WGA operation amount D_out in WGA operation amount maximum limit Pv_lmt is output to the WGA drive part 507 of which details will be described later.

In the WGA operation amount limit value calculation part 506, the actual position Vs detected by the position sensor 53 is input, the limit value to the WGA operation mount is set if the actual position Vs is in a restricted determined position or more, the limit value to the WGA operation mount is disabled if the actual position Vs is less than the limit determined position, and output to the WGA operation amount calculating part 505 as the WGA operation amount maximum limit Pv_lmt.

In the WGA driving part 507, the WGA operation amount D_out from WGA operation amount calculation part 505 is input, based on this information, the operation amount My driven by the WGA34 is output.

Figure 5:
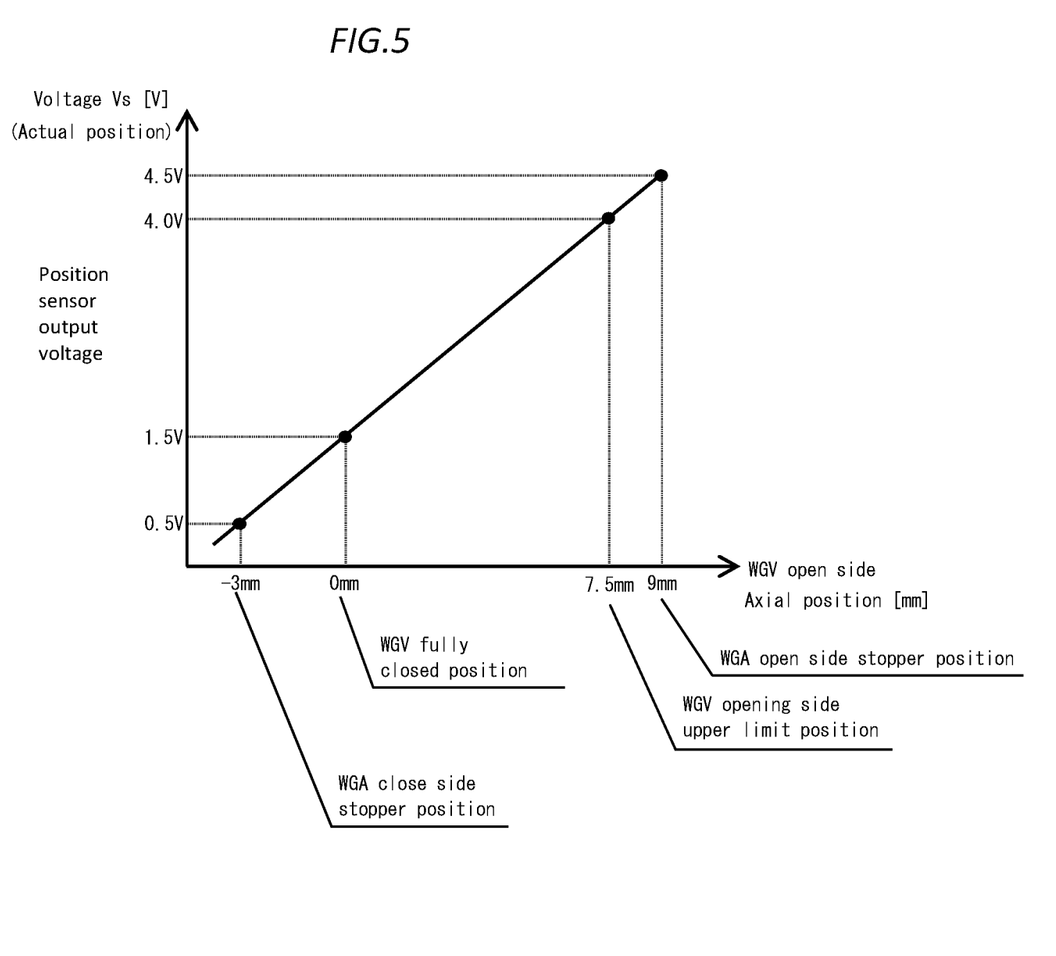
FIG. 5 is a diagram showing an example of the relationship between the opening position and the position sensor output value of WGA according to the first embodiment of the present invention.

FIG. 5 shows the relationship between the axial position of the WGA output shaft 33 and the actual position Vs detected by the axial position and the position sensor 53.

In the axial position which is in a 0 mm position, the WGV31 is in the position where it comes into contact with the position for completely closing the exhaust bypass passage, as the plan value of the output voltage of the position sensor 53 in this position is 1.5V, when in a state where the WGV31 is in the position for completely closing the exhaust bypass passage 30, the actual position Vs of the WGA34 is adjusted to 1.5V, namely the output voltage of the position sensor 53, and then the WGA34 as so adjusted is assembled to the engine.

The position in which the axial position is in a −3 mm position, coming in contact with the closed side stopper of the inside of WGA34, the actual position Vs is 0.5V which is the output voltage of the position sensor 53, but when the WGV31 is moved toward closing side, in order to the WGV31 to be previously in a fully closed position, the WGA34 inside the closed side stopper does not enter in contact.

The position where the axial direction position is 7.5 mm is the open upper limit position of WGA34 set by control as the target opening degree. Since the target opening Sv calculated in the engine requirement target opening calculation part 502 is set from the minimum value of 0% to a maximum value of 100%, in the case where the fully closed learning value Pv_lrn matches the actual fully closed position of the WGV31, the axial position of the WGA, when 1.5V, which is the output voltage of the position sensor 53, the opening degree is 0%, and when 4V which is the output voltage of the position sensor 53, the opening degree is treated as 100%.

Then, when the position of the axial position is 9 mm, the actual position Vs is 4.5V (output voltage of the position sensor 53), WGA34 comes into contact with the opening side stopper inside the WGA. Among normal control, it does not come in contact with the open side stopper position, or even in contact with the open side stopper position, it is controlled so as to be in contact in a speed lower than the collision limit speed, but in the case where the fully closed learning value is shifted to the open side rather than the actual fully closed position, because of the potential contact to the collision limit speed when speed is exceed, as shown in FIG. 6, the collision to the WGA open side stopped in the collision limit speed is avoided.

In addition, since the contact position of the WGA open side is set to the open side rather than the WGA34 open side stopper position, even if moved from the closed side to the WGA34 open side, before the WGV31 reaches the open side contact position, the WGA34 comes in contact with the open side stopper position, the WGV31 can not reach the open side contact position.

Then, the operation of the control apparatus for an engine according to an embodiment of the present invention will be described with reference to the flowchart. FIG. 6 is a flowchart for explaining the operation of the engine control system according to the first embodiment of the present invention, and repeatedly executed at a predetermined control cycle.

Figure 6:
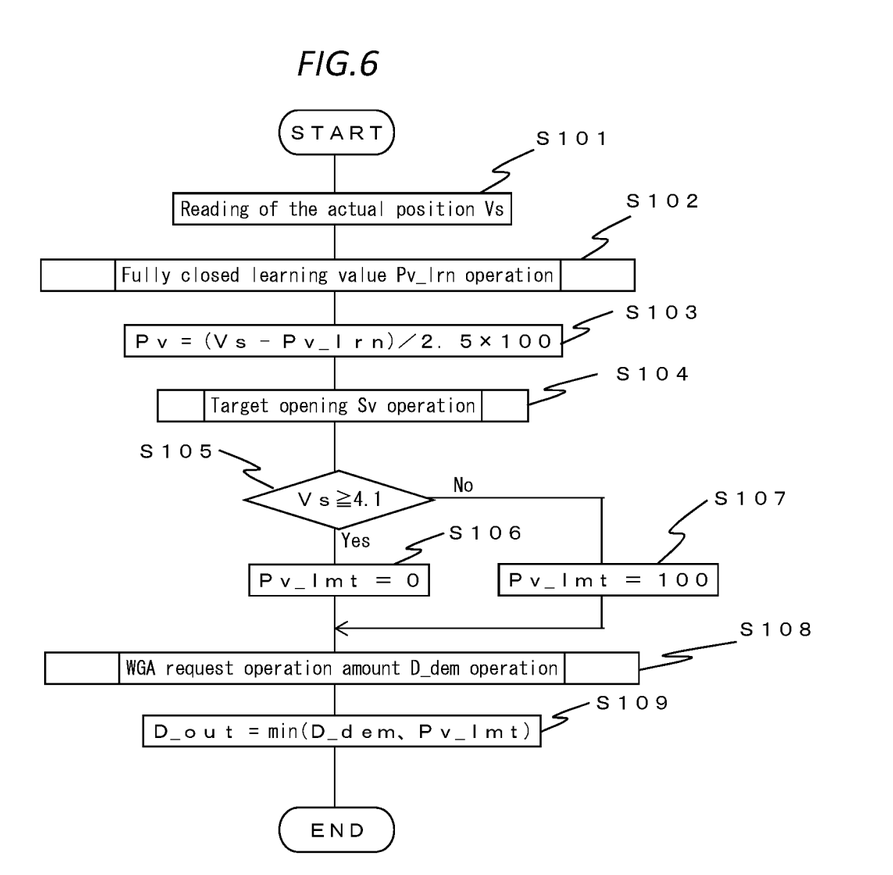
FIG. 6 is a flowchart explaining an example of the operation of the engine control system according to the first embodiment of the present invention.

In FIG. 6, in step S101, the output voltage value of the position sensor 53 as the actual position Vs is read.

In step S102, jumping to the subroutine, at the subroutine the fully closed learning value Pv_lrn is calculated. In the subroutine, the target opening Sv is in the fully closed position, by the WGV coming in contact with the fully closed position, the actual position Vs is determined whether in a stable state or not, if determined to be stable, the actual position Vs is assigned in the fully closed learning value Pv_lrn.

It is also possible to assign the average value of the actual position Vs when stable in the fully closed position.

When assigning the average value of the actual position Vs as well as the actual position Vs in the fully closed learning value Pv_lrn, if the average value of the actual position Vs and the actual position Vs is the position of the open side of the fully closed learning upper limit, the fully closed learning upper limit value is assigned to the fully closed learning value Pv_lrn, if the average value of the actual position Vs and the actual position Vs is rather in the position of the closed side than the fully closed learning lower limit, the fully closed learning lower limit value is assigned to the fully closed learning value Pv_lrn.

In the fully closed learning upper limit and the fully closed learning lower limit, even if there are the output of the position sensor 53 and the assembly of the WGA 34 are scattered, and even if there is a change in temperature in the WGV31, the extreme value of the possible range is set in advance, by limiting the update range of the fully closed learning upper limit range from the fully closed learning lower limit range of the fully closed learning value Pv_lrn, erroneous learning can be prevented.

Further, immediately after the power supply of the controller 50 turns on, the plan value set in advance in the initialization routine is set to the fully closed learning value Pv_lrn as the initial value.

When the update conditions of the fully closed learning value is established in the course of executing the step S102, the fully closed learning value Pv_lrn is updated from the initial value or values learned in the past to the newly learned value.

In step S103, the actual opening degree Pv is calculated by the following equation.

$$Pv=(Vs-Pv\_lrn)/2.5*100 \qquad \text{Formula 1}$$

The value obtained by subtracting the fully closed learning value Pv_lrn from the actual position Vs, in other words, by dividing the amount of change from the fully closed learning value by the maximum variation (2.5V=fully open value (4.0V)–fully closed value (1.5V)) in the control process, and multiplying by 100%, and then actual opening degree Pv is calculated, as 0% to the fully closed learning value Pv_lrn, and as 100% to the fully open value.

In step S104, jumping to the subroutine for calculating the target opening degree Sv of the WG, the target opening degree Sv for matching the actual supercharging pressure Pp to the target boost pressure Sp obtained from the map of the FIG. 4 is calculated.

In step S105, the actual position Vs is determined whether there are 4.1 V, being the output voltage of the position sensor 53, or more.

In the step S105, when actual position Vs is 4.1 V, being the output voltage of the position sensor 53, or more, the process goes to step S106 to set the WGA operation amount maximum limit Pv_lmt to 0%.

In step S105, when the actual position Vs is less than 4.1V, being the output voltage of the position sensor 53, the process goes to step S107 to set the WGA operation amount maximum limit Pv_lmt to 100%.

The restricted determinate position is determined based on the 1.5 V plan value of the fully closed position on the output voltage of the position sensor 53, by setting the 4V position corresponding to 100% of the maximum target opening to the 4.1V position open side on the output voltage of the position sensor 53, when the largest opening degree of the target opening Sv is 100%, when the actual opening Pv is in the closed side more than the target opening Sv, the actual opening Pv, it becomes possible to avoid the compliance issue to the target opening Sv. Further, the restricted determinate in a 4.1V position on the output voltage of the position sensor 53, by setting the closing side rather than the opening side stopper in a 4.5V position on the output voltage of the position sensor 53, the actual opening Pv can avoid contact at a rate that exceed the collision limit speed to the WGA34 open side stopper position.

Depending on the thermal expansion of the WGV31 and/or the abrasion of the contact part of the exhaust bypass passage 30 and the WGV31, even if the fully closed position of the WGV31 is changed, the open side stopper position of the WGA34 does not change. Since the WGA operation amount maximum limit Pv_lmt is set by comparing the actual position Vs and the restricted determinate position 4.1V on the output voltage of the position sensor 53, even if the fully closed learning value is changed, since the WGA operation amount maximum limit Pv_lmt can be set to an opening position of a defined closed side deviation from the open side stopper of the WGA34, it is possible to avoid the contact by exceeding the allowable limit speed to the WGA34 open side stopper.

In step S108, jumping to the subroutine that calculates the WGA request operation amount D_dem, at the subroutine, a feedback control according to the deviation of the target opening Sv and the actual opening Pv is performed, and the WGA request operation amount D_dem, which is so necessary that the actual opening Pv is in compliance with the target opening Sv, is calculated. WGA request operation amount D_dem is the Duty value, calculated at a Plus value when operating the open side, and at a Minus value when operating the closed side. WGA request operation maximum amount D_dem is 100%, and WGA request operation minimum amount is −100%. The WGA request operation maximum amount D_dem, in the absence of disturbance in WGV31, stops regardless of the WGV opening position.

In the step S109, the WGA operation amount D_out is calculated as follow.

$$D\_out = \min(D\_dem, Pv\_lmt) \quad \text{Formula 2}$$

In the WGA operation amount D_dem and the WGA operation amount maximum limit Pv_lmt, the smaller value processes the WGA operation amount D_out.

The WGA operation amount D_dem, in the case where the value is more than the WGA operation amount maximum limit Pv_lmt, the WGA operation amount maximum limit Pv_lmt processes the WGA operation amount D_out, when the value is smaller than the WGA operation amount maximum limit Pv_lmt, the WGA operation amount D_dem processes the WGA operation amount D_out.

Figure 7:
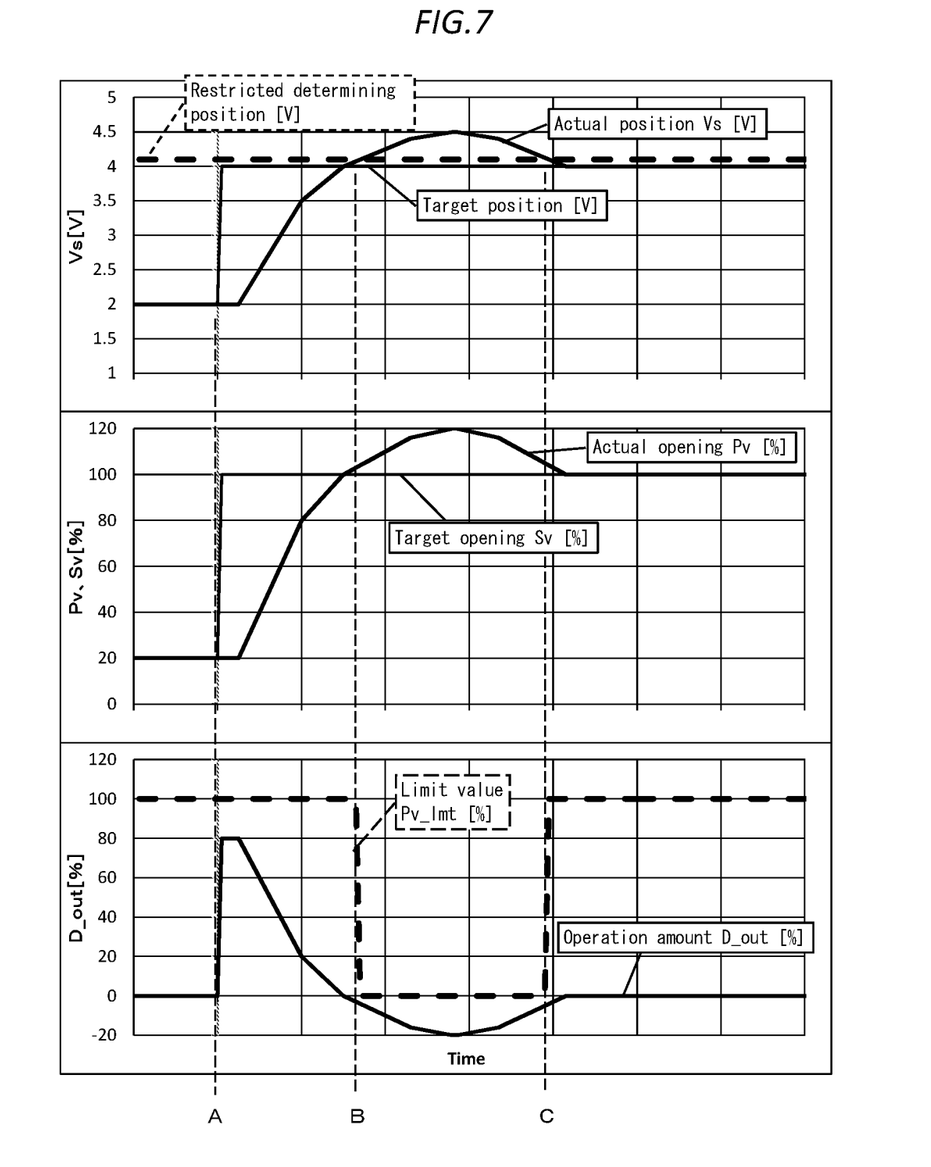
FIG. 7 is a time chart showing an example of the WGA operation amount, the actual opening degree as well as the WGV target opening degree according to the first embodiment of the present invention.
Figure 9:
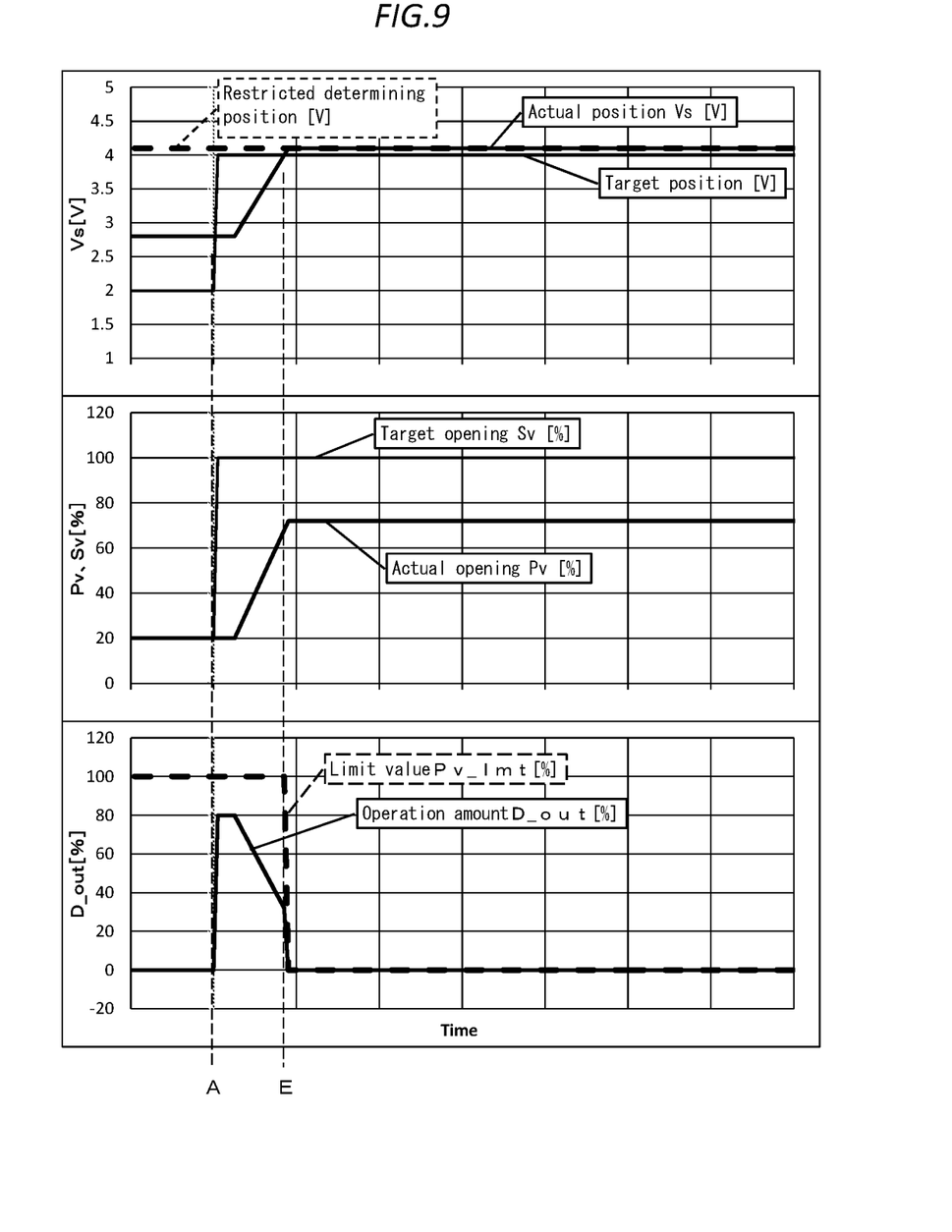
FIG. 9 is a time chart showing an example of the operation amount of the WGA, the actual opening degree as well as the WGV target opening degree according to the first embodiment of the present invention.

FIG. 7 and FIG. 9 is a time chart showing the operation of executing the flow chart of FIG. 6.

Figure 8:
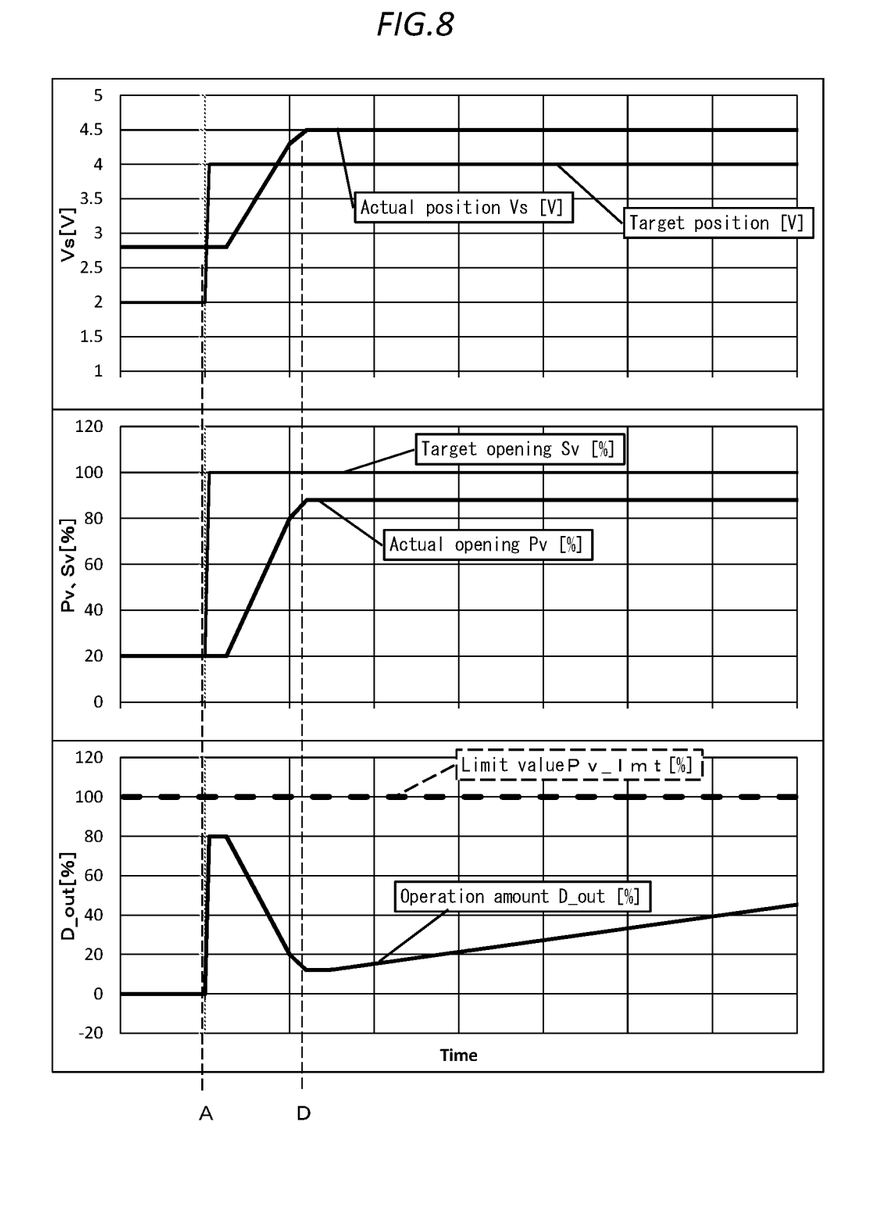
FIG. 8 is a time chart showing an example of the operation amount of the WGA, the actual opening degree as well as the WGV target opening degree according to a conventional technology.

FIG. 8 is a time chart showing the operation when there is no limitation with the WGA operation amount maximum limit Pv_lmt.

In FIG. 7, 8, 9, by using the 1.5V setting value of the fully closed position of the percentage value of the target opening Sv described in the second row from the top of the graph, the target position described in the first row from the top on the graph is obtained by conversion into a voltage value, and not described in the bloc diagram of the FIG. 3 and the flow chart of the FIG. 6.

FIG. 7 shows the operation in the case that the fully closed learning value Pv_lrn is matching with the fully closed position of the WGV31, in FIG. 7 the fully closed learning value Pv_lrn is the 1.5V which is the output voltage of the position sensor 53 and also the WGV fully closed position shown in FIG. 5.

Before the point A on left side of A in FIG. 7 is controlled by the supercharging pressure target opening Sv at 20%. At this time, the actual position Vs is 2V being the output voltage of the position sensor 53, the actual opening degree Pv converted by the equation 1 from the actual position Vs is controlled by feedback in order to match with the target opening degree Sv.

In the point A, when the target opening Sv is changed from 20% to 100%, the actual opening Pv start its compliance with the target opening Sv according to the feedback control.

At point B, the actual opening degree Pv has exceeded the target opening degree Sv, since the actual position Vs exceeds the determinate limit position 4.1V being the output voltage of the position sensor 53, the WGA operation amount maximum limit Pv_lmt varies from 100% to 0%. Since the actual opening degree Pv, is overshot to the open side more than the target opening degree Sv, the WGA operation amount D_out becomes a negative value by feedback control, there is no limit in the WGA operation amount maximum limit Pv_lmt, the WGA request operation amount D_dem is determined by feedback control from the actual opening Pv and the target opening Sv, becomes the WGA operation amount D_out and is sent to the WGV drive part 507.

In the point C, the actual opening degree Pv converges to the target opening degree Sv by feedback control, since the actual position Vs is less than the determined limit position 4.1V being the output voltage of the position sensor 53, the WGA operation amount maximum limit Pv_lmt is changed from 0% to 100%.

In this way, if the fully closed learning value Pv_lrn matches the actual fully closed position of the WGV31, even if the actual position VS exceeds the determinate position limit, the actual opening degree Pv is in the open side rather than the target opening degree Sv, since the WGA request operation amount D_dem according to the deviation of the actual opening degree Pv and the target opening degree Sv by feedback control is set to the WGA operation amount D_out without being limited to the WGV operation amount maximum limit Pv_lmt, the actual opening degree Pv quickly converges to the target opening degree Sv.

In FIG. 8, as time passes when the fully closed learning value Pv_lrn is learning, the temperature conditions and operating conditions change, more than the point when the fully closed learning value Pv_lrn have learned, the fully closed position change to the closed side, with the fully closed learning value Pv_lrn in the open side position more than the actual fully closed position, the WGA operation amount maximum limit Pv_lmt is not set, operates when the WGA operation amount D_out is not limited, and operates the equivalent existing technology.

Before point A on the left side A of FIG. 8, the target opening degree Sv is controlled in the supercharging pressure to be at 20%. The actual position Vs is 2.8V being the output voltage of the position sensor 53, the actual opening degree Pv converted by the formula 1 from the actual position Vs is feedback controlled to match with the target opening degree Sv.

In the point A, the actual opening degree Pv starts the compliance with the target opening degree Sv according to the feedback control when the target opening degree Sv changes from 20% to 100%.

In the point D, the WGA34 open side stopper position is in contact, the actual position becomes 4.5V being the output voltage of the position sensor 53 and in a state that can not operate any more open side. At that time, since the actual opening degree Pv is 88% and does not reach the 100% of the target opening degree Sv, after the point D and according to the feedback control, WGA operation amount D_out is further increased, the amount of heat generated by the electric WGA34 increases.

In FIG. 9, as time passes, when the fully closed learning value Pv_lrn is learning, the temperature conditions and operating conditions change, the actual fully closed position is changed to the closing side more than the fully closed learning value Pv_lrn learning point, the fully closed learning value Pv_lrn is in the position of the open side more than the true fully closed position, the WGA operation amount maximum limit Pv_lmt operates when the limit possible value is set and the WGA operation amount D_out is limited.

In the point A, the actual opening degree Pv starts the compliance to the target opening degree Sv by the feedback control when the target opening degree is changed from 20% to 100%.

In the point E, the actual position Vs, since the determined limit position 4.1V being the output voltage of the position sensor 53 is exceeded, the WGA operation amount maximum limit Pv_lmt is changed from 100% to 0%. Since the actual opening degree Pv is more in the closed side than the target opening degree Sv, a feedback control is done, the WGA request operation amount D_dem calculates a positive value, because of the restriction by the WGA operation amount maximum limit Pv_lmt, the WGA operation amount D_out is limited to 0%. As a result, the actual position Vs is stopped in approximately 4.1V, which is the output voltage of the position sensor 53, in the vicinity of the WGA operation amount maximum limit Pv_lmt, and prevented from being brought into contact with the WGA34 open side stopper position.

Since the actual opening degree Pv is more in the closed side than the target opening degree Sv, a feedback control is done, the WGA request operation amount D_dem is going to increase as the time passes, as the WGA operation amount D_out is limited to 0% according to the WGA operation amount maximum limit Pv_lmt, it is possible to prevent the WGA of the motor is overheating.

The 0% of WGA operation amount maximum limit Pv_lmt set when the actual position Vs becomes over the 4.1V, which is the output voltage of the position sensor 53, defined limit position is not limited to 0%. In order to maintain the stopped state, in the width from 0% to plus or minus ten % or so by friction, within the range in which the stop state can be maintained, it may be set within a range of 0% plus or minus ten % or so.

In this manner, according to the configuration according to claim 4, when the actual position Vs is equal to or greater than the predetermined position, by controlling the WGA request operation amount D_dem as the WGA operation amount D_out with a value limited by the WGA operation amount maximum limit Pv_lmt, even in the case where the open side is more shown than the WGV31 actual fully closed position in the state where the fully closed learning value Pv_lrn is in an un-updated state, since it is possible for the WGA open side stopper position to be in contact at or under permissible speed or not to be in contact, it is possible to avoid an unpleasant collision sound at the time of the contact.

Further, according to the configuration of claim 5, since the 4.1V restricted limit position is greater than the 4.0V which is the output voltage of the position sensor 53 and which is the 100% upper limit set value of the target opening, and have a smaller range value than the WGA open site stopper position 4.5V, which is the output voltage of the position sensor 53, it is limited by WGA operation amount maximum limit Pv_lmt when the limit of the WGA operation amount D_out is required, and not limited by WGA operation amount maximum limit Pv_lmt when the limit of the WGA operation amount D_out is not required.

Furthermore, by comparing the restricted limit position and the actual position detected by the position sensor, it is possible to set a limit value when reaching a predetermined opening deviation from the WGA open side stopper position.

Also, according to the configuration of claim 6, the operation amount opening side limit value, by setting a value in order to be able to stop or stall the value of the WGA34 that operate in the open side, before a contact with the WGA34 open side stopper position, since it is possible to stop the WGA34 open side operation, the motor can be prevented from overheating because that the WGA operation quantity becomes excessive in a state in which the WGA34 is in contact with the open side stopper position.

In the first embodiment, the control device of the exhaust bypass valve and its control method in the waste gate valve has been described, but can also be applicable in a valve using a member driven by electric energy such as a valve of an EGR, i.e. Exhaust Gas Recirculation.

Various modifications and alterations of this invention will be apparent to those skilled in the art without departing from the scope and spirit of this invention, and it should be understood that this is not limited to the illustrative embodiments set forth herein.

In the drawings, the same reference numerals denote the same or corresponding parts.

What is claimed is:

1. A control system for an internal combustion engine, comprising:
   a control device configured to control an operation amount of a waste gate actuator driven by electrical energy; and
   a position sensor configured to detect an actual position of the waste gate actuator; wherein
   the waste gate actuator controls the opening and closing of a waste gate valve according to the operation amount controlled by the control device;
   the actual position of the waste gate actuator detected by the position sensor, which correlates to an actual open position of a waste gate valve, is inputted to the control device;
   the control device performs control for limiting the operation amount such that the waste gate actuator stops a predetermined opening deviation in the direction toward an open side from an open side stopper position of the waste gate actuator, the predetermined opening deviation corresponding to a restricted determination position which is set between the open side stopper position of the waste gate actuator and a position corresponding to a maximum target opening degree of the waste gate actuator obtained based on a learned reference position that corresponds to the actual position of the waste gate actuator detected by the position sensor when the waste gate valve is in a fully closed position.

2. A control system for an internal combustion engine, comprising:
   a control device configured to control an operation amount of a waste gate actuator driven by electrical energy; and
   a position sensor configured to detect an actual position of the waste gate actuator; wherein
   the control device comprises:
      a driving part for controlling the opening and closing of a waste gate valve by driving the waste gate actuator according to the operation amount;
      a reference position learning part that learns a reference position that corresponds to the actual position detected by the position sensor when the waste gate valve is in a fully closed position;

an actual opening degree calculation part for calculating an actual opening degree of the waste gate valve based on the reference position learned by the learning position part and the actual position detected by the position sensor;

a request operation amount calculating part that calculates the operation amount for the driving part based on the actual opening degree of the waste gate valve and a target opening degree of the waste gate valve;

an operation amount limiting value calculating part that calculates an operation amount open side limit value for limiting the operation amount for the driving part, the operation amount open side limit value being a value corresponding to a restricted determination position which is set between an opening side stopper of the waste gate actuator and a position corresponding to a maximum target opening degree of the waste gate actuator obtained based on the learned reference position when the waste gate valve is in the fully closed position; and an operation amount limiting part for limiting the operation amount to the operation amount open side limit value.

3. The control system for an internal combustion engine according to claim 2, wherein the operation amount opening side limit value is calculated by switching effective and invalid values by comparing the actual position detected by the position sensor with the restricted determination position, and the effective values are set to a possible value by stalling an operation speed of the waste gate actuator or stopping the waste gate actuator when the waste gate actuator moves past the restricted determination position toward the opening side stopper of the waste gate actuator.

* * * * *